United States Patent
Krishnappa et al.

(10) Patent No.: US 11,345,587 B2
(45) Date of Patent: May 31, 2022

(54) MULTIFUNCTIONAL DISPENSING SYSTEM WITH OVERHEAD FUEL/AIR DELIVERY

(71) Applicant: Wayne Fueling Systems LLC, Austin, TX (US)

(72) Inventors: Vinod Krishnappa, Karnataka (IN); Sangamesh Gundappa, Karnataka (IN)

(73) Assignee: WAYNE FUELING SYSTEMS LLC, Austin, TX (US)

( * ) Notice: Subject to any disclaimer, the term of this patent is extended or adjusted under 35 U.S.C. 154(b) by 0 days.

(21) Appl. No.: 16/908,624

(22) Filed: Jun. 22, 2020

(65) Prior Publication Data
US 2021/0398383 A1    Dec. 23, 2021

(51) Int. Cl.
| | |
|---|---|
| *B67D 7/04* | (2010.01) |
| *B60S 5/04* | (2006.01) |
| *B67D 7/12* | (2010.01) |
| *G07F 13/02* | (2006.01) |

(52) U.S. Cl.
CPC ............. *B67D 7/0401* (2013.01); *B60S 5/04* (2013.01); *B67D 7/12* (2013.01); *G07F 13/025* (2013.01); *B67D 2007/0425* (2013.01); *B67D 2007/0436* (2013.01)

(58) Field of Classification Search
CPC ........... B67D 7/0401; B67D 2007/0403–0474; B60S 5/02; B60S 5/04; B60S 5/043; B60S 5/046; B25J 9/00
See application file for complete search history.

(56) References Cited

U.S. PATENT DOCUMENTS

| | | | |
|---|---|---|---|
| 1,948,158 A | 2/1934 | Barr | |
| 2,002,777 A | 5/1935 | Johnson | |
| 2,893,422 A * | 7/1959 | Schiltz | B67D 7/38 137/355.17 |
| 3,364,940 A * | 1/1968 | Ginsburgh | B67D 7/0401 137/234.6 |
| 3,670,930 A | 6/1972 | Irie et al. | |
| 3,883,042 A | 5/1975 | Junker | |
| 4,702,287 A * | 10/1987 | Higbie | B60S 5/046 141/4 |
| 5,609,190 A * | 3/1997 | Anderson | B67D 7/0401 138/112 |

(Continued)

FOREIGN PATENT DOCUMENTS

WO    0153192 A1    7/2001

OTHER PUBLICATIONS

Invitation to Pay Additional Fees received for PCT Application No. PCT/US2021/036453, dated Aug. 30, 2021, 13 pages.

*Primary Examiner* — Andrew D StClair
(74) *Attorney, Agent, or Firm* — Mintz Levin Cohn Ferris Glovsky and Popeo, PC; Lisa Adams; Alexander G. Roan

(57) ABSTRACT

Various multifunctional dispensing systems with overhead fuel/air delivery and methods for using the same are provided. Such a system can include a dispenser system and an overhead delivery unit suspended on tracks above a vehicle drive aisle at a fueling station. The overhead delivery unit can include a fuel dispensing nozzle and an air dispensing nozzle that can be moved about the tracks so as to optimally position the nozzles to be approximately overhead the fuel doors and tires, respectively. Such an arrangement allows a customer to refuel their vehicle and inflate their tire(s) without moving their car between each transaction.

19 Claims, 7 Drawing Sheets

(56) References Cited

U.S. PATENT DOCUMENTS

| | | | |
|---|---|---|---|
| 6,237,647 B1 * | 5/2001 | Pong | B67D 7/0401 |
| | | | 141/231 |
| 6,466,843 B1 * | 10/2002 | Bonanni | B25J 9/1694 |
| | | | 318/568.11 |
| 10,726,508 B2 | 7/2020 | Morris et al. | |
| 2003/0041330 A1 | 2/2003 | Smith | |
| 2008/0223951 A1 * | 9/2008 | Tracey | A01G 25/16 |
| | | | 239/71 |
| 2018/0075567 A1 * | 3/2018 | Mycroft | G06Q 20/18 |
| 2018/0215043 A1 * | 8/2018 | Michalakis | B60S 3/04 |
| 2019/0106317 A1 * | 4/2019 | Sahota | G06Q 20/28 |

* cited by examiner

MULTIFUNCTIONAL DISPENSING SYSTEM WITH OVERHEAD FUEL/AIR DELIVERY

FIELD

The present disclosure relates generally to a multifunctional dispensing system with an overhead fuel/air nozzle.

BACKGROUND

Today, to fill vehicle fuel tanks and inflate tires at a fueling station, customers are required to fill their vehicle fuel tanks at a fuel dispenser in one area of the fueling station and to inflate their tires at an air dispenser at another area of the fueling station. During such a visit, after completing a transaction at one of these dispensers, the customer may have to wait with their car, either at the dispenser or elsewhere at the refuelling station, in the event that the other dispenser is occupied by another customer. This is an inconvenience to the customer and can result in lost revenue if the customer is unable to wait until the other dispenser becomes available and has to leave the refuelling station. In addition, this scenario results in inefficient use of the fueling station, a reduction in the rate of revenue collection opportunities, and unnecessary congestion at the refuelling station.

Accordingly, there remains a need for improved dispensing units.

SUMMARY

In general, a multifunctional dispensing system with overhead air/fuel delivery is provided.

In one aspect, a multifunctional dispensing system is provided and can include an overhead delivery unit configured to be disposed above a fueling/inflation location. The overhead delivery unit can include a housing, a fuel dispensing component disposed at least partially in the housing and configured to dispense fuel, and an air dispensing component disposed at least partially in the housing and configured to dispense air. The fuel dispensing component can include a fuel dispenser nozzle, and the air dispensing component can include an air dispenser nozzle. The multifunctional dispensing system can also include a dispenser system. The dispenser system can include an image sensor and at least one data processor operatively connected to the image sensor. The at least one data processor can be configured to receive an image from the image sensor. The image can include a visual depiction of a vehicle in the fueling/inflation location. The at least one data processor can further be configured to determine a position of a feature of the vehicle, to determine a translation instruction configured to command the housing to translate such that at least one of the fuel dispenser nozzle and the air dispenser nozzle is positioned overhead of the vehicle feature, and to provide the translation instruction to the housing.

One or more of the following features can be included in any feasible combination. For example, the fuel dispensing component can include a fuel hose disposed on a fuel hose reel that is coupled to the fuel dispenser nozzle and is configured to supply fuel to the fuel dispenser nozzle, and the air dispensing component can include an air hose disposed on an air hose reel that is coupled to the air dispenser nozzle and is configured to supply air to the air dispenser nozzle. For example, the fuel hose reel can be configured to rotate in response to an instruction provided by the at least one data processor to thereby raise or lower the fuel dispenser nozzle. For example, the air hose reel can be configured to rotate in response to an instruction from the at least one data processor to thereby raise or lower the air dispenser nozzle. For example, the air hose can be in fluid communication with an air regulator configured to modulate a pressure level of air received at the air regulator based on a regulation instruction provided by the at least one data processor. For example, the air regulator can be at least partially disposed in the housing. For example, the fuel hose reel and the air hose reel can each be at least partially disposed in the housing. For example, the overhead delivery unit can include a cross member having a first end and a second end opposite the first end, disposed proximate the housing, and coupled thereto by a mounting bracket coupled to an exterior surface of the housing. For example, the housing can be configured to translate along the cross member between the first end and the second end in response to the translation instruction. For example, the overhead delivery unit can further include a first track and a second track, each of the first track and the second track coupled to the cross member. For example, the cross member can be configured to translate along the first track and the second track in response to the translation instruction.

In another aspect, an overhead fluid delivery unit is provided and can include a housing, a fuel dispensing component disposed at least partially in the housing, configured to dispense fuel, and having a fuel dispenser nozzle, an air dispensing component disposed at least partially in the housing, configured to dispense air, and having an air dispenser nozzle, a cross member configured to slidably couple to the housing, and a plurality of tracks. Each of the plurality of tracks can be configured to slidably couple to the cross member and to be disposed above a fueling/inflation location. The cross member and the plurality of tracks can be configured to permit the housing to translate across the fueling/inflation location.

One or more of the following features can be included in any feasible combination. For example, the housing can be in operable communication with a dispenser system that can include an image sensor and at least one data processor operatively connected to the image sensor. For example, the at least one data processor can be configured to receive an image from the image sensor. For example, the image can include a visual depiction of a vehicle in the fueling/inflation location. For example, the at least one data processor can further be configured to determine a position of a feature of the vehicle, to determine a translation instruction configured to command the housing to translate such that at least one of the fuel dispenser nozzle and the air dispenser nozzle is positioned overhead of the vehicle feature, and to provide the translation instruction to the housing. For example, the fuel dispensing component can further include a fuel hose disposed on a fuel hose reel, coupled to the fuel dispenser nozzle, and configured to supply fuel to the fuel dispenser nozzle, and the air dispensing component can further include an air hose disposed on an air hose reel, coupled to the air dispenser nozzle, and configured to supply air to the air dispenser nozzle. For example, the fuel hose reel can be configured to rotate in response to an instruction provided by the at least one data processor to thereby raise or lower the fuel dispenser nozzle. For example, the air hose reel can be configured to rotate in response to an instruction from the at least one data processor to thereby raise or lower the air dispenser nozzle. For example, the air hose can be in fluid communication with an air regulator configured to modulate a pressure level of air received at the regulator based on a regulation instruction provided by the at least one data processor. For example, the air regulator can be at least partially disposed in the housing. For example, the fuel hose reel and the air hose reel can each be at least partially disposed in the housing. For example, the fuel dispenser nozzle can be configured to dispense varying grades of fuel.

DESCRIPTION OF DRAWINGS

This invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Figure 1:
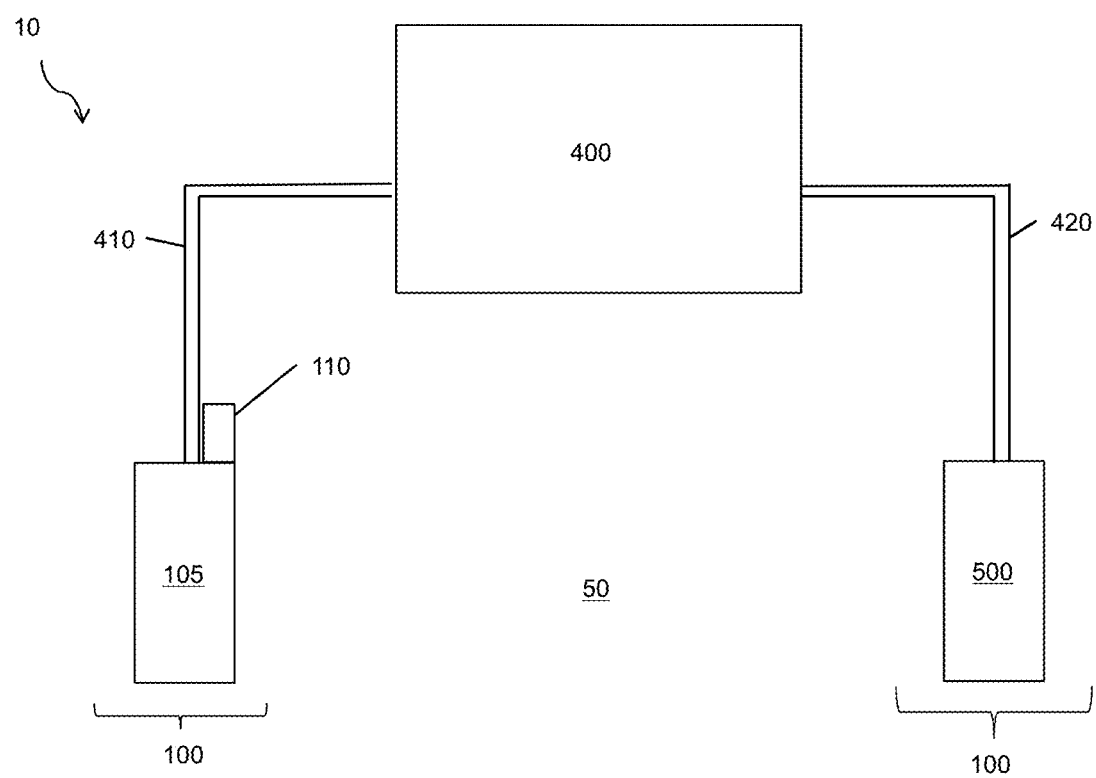
FIG. 1 is schematic view of one embodiment of a multifunctional dispensing system having a dispenser system and an overhead delivery unit.

Various multifunctional dispensing systems with overhead fuel/air delivery are provided. In general, as shown in FIG. 1, such a multifunctional dispensing system 10 can include a dispenser system 100 and an overhead delivery unit 400. The dispenser system 100 is configured to manage a fueling and/or tire inflation transaction, and is in both operable and fluid communication with the overhead delivery unit 400. The overhead delivery unit 400, which is suspended overhead of the fueling/inflation location 50, includes a fuel dispenser nozzle and an air dispenser nozzle which are configured to deliver fuel and/or air, respectively, received from the dispenser system 100 to a customer's vehicle parked in a fueling/inflation location 50. To facilitate the fueling and/or tire inflation transaction, the overhead delivery unit 400 can be moved about the vehicle fueling/inflation location 50 so as to optimally position the nozzles to be approximately overhead the fuel filler door and tires, respectively. The overhead delivery unit 400 can thus allow a customer to refuel their vehicle and inflate their tires without moving their car between each transaction.

As shown in FIG. 1, the dispenser system 100 generally includes a dispenser 105 that is located proximate the fueling/inflation location 50 and is configured to supply fuel to the overhead delivery unit 400 via a fuel supply line 410 coupled thereto. As explained in further detail below, the dispenser 105 is also in operable communication with the overhead delivery unit 400 and is configured to transmit operating commands determined by the dispenser 105 to the overhead delivery unit 400, such as movement and/or fuel/air dispensation commands. The dispenser system 100 can include an image sensor 110 that is configured to acquire an image of the customer and/or a vehicle parked in the fueling/inflation location 50 for use by the dispenser 105 in determining the operating commands and providing a customized fueling/inflation experience. As shown, the image sensor 110 is disposed on the dispenser 105, however the image sensor 110 can also be disposed in another location in the vicinity of the vehicle fueling/inflation location 50, such as proximate the overhead delivery unit 400, and oriented such that fueling/inflation location 50 is within the field of view of the image sensor 110. The dispenser system 100 also includes an air compressor 500 that is configured to provide a supply of compressed air to the overhead delivery unit 400. As shown, the air compressor 500 is proximate the vehicle fueling/inflation location 50, however the air compressor 500 can be located elsewhere at a fueling station.

Figure 2:
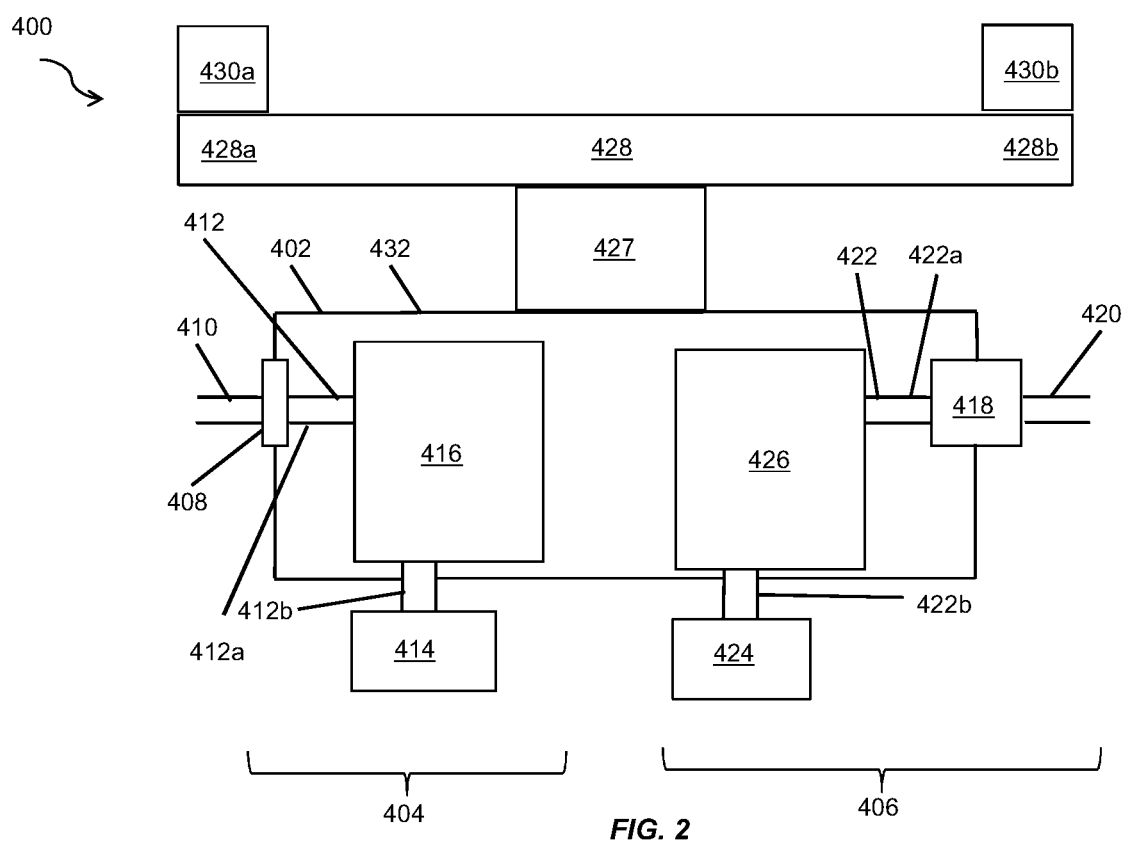
FIG. 2 is a schematic detail view of the overhead delivery unit of the multifunctional dispensing system of FIG. 1.

FIG. 2 shows a schematic illustration of the overhead delivery unit 400. The overhead delivery unit 400 includes a fuel dispensing component 404 and an air dispensing component 406, each of which are disposed at least partially in a housing 402. The fuel dispensing component 404 is configured to receive the operating commands from the dispenser 105 for operating various subcomponents of the fuel dispensing component 404, as described in further detail below. The air dispensing component 406 is also in operable communication with the dispenser 105 and is similarly configured to receive the operating commands therefrom for operating the various subcomponents of the air dispensing component 404, as described in further detail below. The air dispensing component 406 receives the compressed air from the air compressor 500, which is also configured to receive operating commands from the dispenser 105.

The fuel dispensing component 404 includes a fuel inlet 408 that receives fuel from the fuel supply line 410. The fuel supply line 410 is coupled to the fuel inlet 408 on one end and coupled to a fuel outlet on the dispenser 105 at its opposite end. The fuel inlet 408, in turn, is coupled to a first end 412a of a fuel dispenser hose 412. A fuel dispenser nozzle 414 is coupled to a second end 412b of the fuel dispenser hose 412 and is configured to deliver the fuel received from the fuel dispenser hose 412 to a customer's fuel tank (not shown). The fuel dispenser hose 412 is disposed on a hose reel 416 that is configured to rotate, based on a command received from the dispenser 105, and thereby extend and retract the fuel dispenser hose 412, and correspondingly raise and lower the fuel dispenser nozzle 414 coupled thereto, as explained in further detail below. As shown, the fuel dispensing component 404 includes one fuel inlet, one fuel dispenser hose, and one fuel dispenser nozzle, which are configured to carry multiple blends/grades of fuel. However, in some embodiments, the fuel dispensing component can include multiple sets of fuel inlets, fuel dispenser hoses, and dispenser nozzles, each corresponding to a specific type or grade of fuel (e.g., 87 octane gasoline, 93 octane gasoline, diesel fuel, etc.).

Similarly, the air dispensing component includes an air regulator 418 at an inlet of the air dispensing component that receives compressed air from an air supply line 420 at one end and provides regulated air to an air delivery hose 422 at its opposite end. The air supply line 420 is coupled to an air compressor 500 at its opposite end that is configured to generate the compressed air for use in the inflation transaction. The air regulator 418 can be in operable communication with the dispenser 105 and can be configured to modulate the pressure of the compressed air received from the air compressor such that it provides air at the desired pressure level specified in a command received from the dispenser system 100, to a first end 422a of the air delivery hose 422. An air dispenser nozzle 424 is coupled to a second end 422b of the air delivery hose 422. The air dispenser nozzle 424 is configured to attach to an air valve (not shown) on, for example, a vehicle tire to allow a customer to inflate their tires. The air delivery hose 422 is disposed on a hose reel 426 that is configured to extend and retract the air delivery hose 422—and thereby raise and lower the air dispenser nozzle 424—in response to a command received from the dispenser system 100 during the inflation transaction, as explained in further detail below. As shown, the air dispensing component includes one air regulator, one air delivery hose, and one air dispenser nozzle, for inflating one tire at a time. However, in some embodiments, the air dispensing component can include more than one air regulator/air delivery hose/air dispenser nozzle, which can enable a customer to inflate more than one tire at a time and thereby expedite the inflation transaction.

The housing 402 can be coupled to a support bar or cross member 428 using various techniques, such as via a mounting bracket 427 disposed on the housing, as shown in FIG. 2. The illustrated cross member 428 includes a first end 428a and a second end 428b opposite the first end. As shown, the mounting bracket 427 is coupled to an upper surface 432 of the housing 402, such that the housing 402 hangs below the cross member 428. However, in some embodiments, the mounting bracket 427 can instead be coupled to a lower surface of the housing, such that the housing 402 is disposed on top of the cross member 428 when coupled thereto. The mounting bracket 427 can include wheels (not shown) at the point of coupling with the cross member 428 that can permit the housing 402 to translate along the cross member 428 between the first end 428a and the second end 428b. The first end 428a of the cross member 428 can be coupled to a first track 430a, and the second end 428b can be coupled to a second track 430b, each of which is located overhead of the vehicle fueling/inflation area and proximate the dispenser base.

As shown, the first and second tracks 430a, 430b can be can be oriented parallel to one another and perpendicular to the cross member 428. The cross member can be configured to slide along the tracks 430a, 430b and thereby allow the housing 402 of the overhead delivery unit 400 to translate forward and backward within the vehicle fueling/inflation location. As the mounting bracket 427 is coupled to the cross-member 428 by wheels, the mounting bracket 427 (and therefore the housing coupled thereto) can also laterally translate left/right across the vehicle fueling/inflation area. As explained in further detail below, this permits the dispenser 105 to adjust the position of the housing 402 relative to the vehicle to bring the fuel nozzle closer to the fuel filler door for ease in fueling the vehicle.

The housing 402 of the overhead delivery unit 400 can be moved to a desired position in several ways. For example, the overhead delivery unit can be hydraulically actuated. In such an arrangement, a series of hydraulic cylinders and pumps can be utilized to laterally translate the overhead multi-dispensing unit. In addition, electric motors could be used in lieu of the hydraulic system to achieve the same end.

Figure 3:
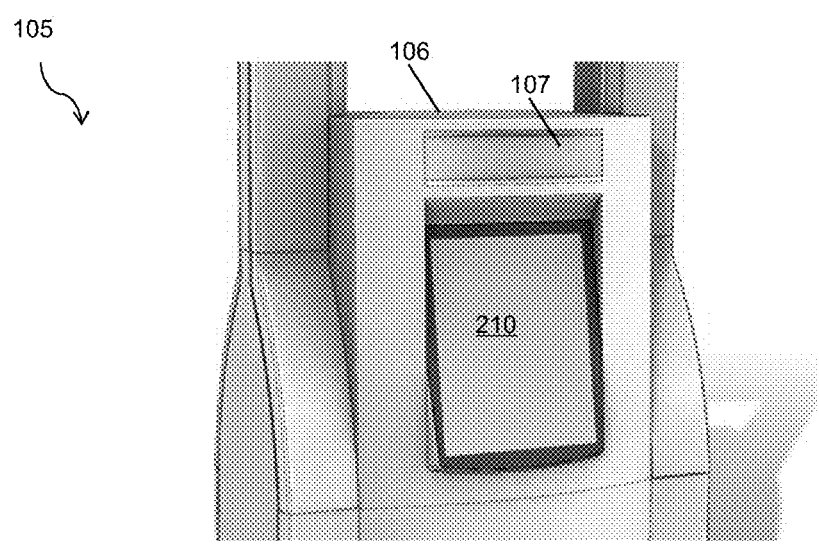
FIG. 3 is a perspective view of one embodiment of a portion of a dispenser which can be used with the multifunctional dispensing system of FIG. 1.

FIG. 3 shows an intermediate portion of one embodiment of a dispenser 105, e.g., top and bottom portions of the dispenser 700 are omitted. The illustrated dispenser 700 includes a housing 106, a display 210 attached to the housing 106, electronics (not shown) disposed within the housing 106, an information panel 107 to facilitate payment, inflation, and/or fueling (e.g., by including a card reader, by showing amounts of fuel dispensed in a fueling session, by showing prices of different grades of fuel, by including image sensor(s), by showing a current air pressure of a tire, by including motion sensor(s), etc.), and fuel dispensing components (not shown) (e.g., a pump, a fuel meter, a hose, etc.) attached to and/or disposed in the housing 106. The display 210 includes a GUI display space and is a flexible touchscreen for the user to interact and manage the fueling/tire inflation transaction(s). A person skilled in the art will appreciate that various fuel dispensers can be utilized with the multifunctional dispensing system disclosed herein.

Figure 4:
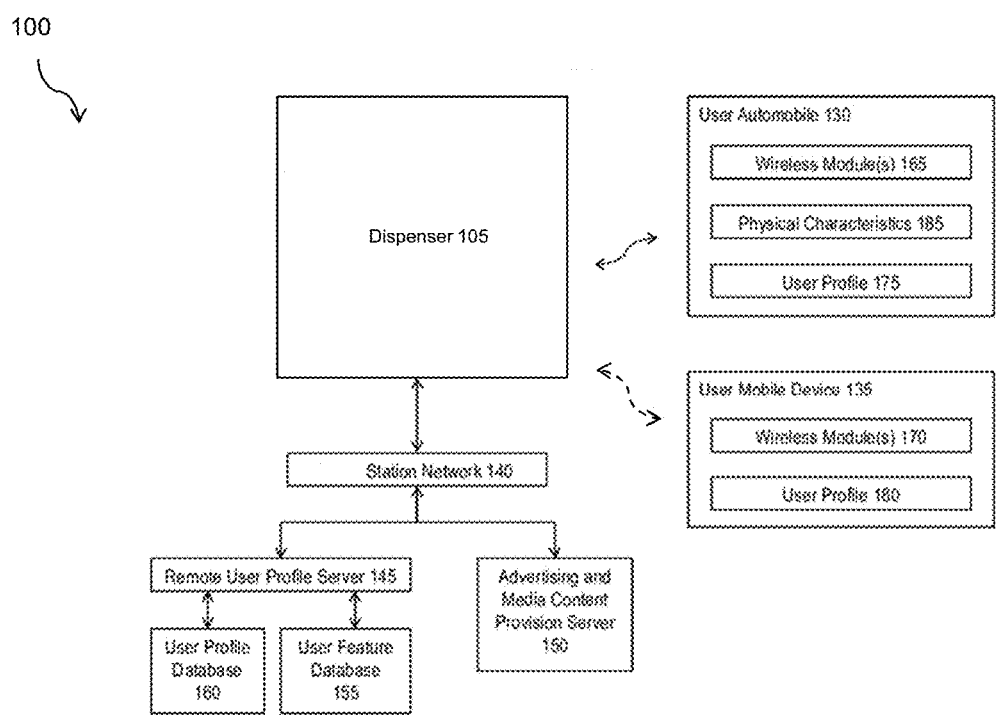
FIG. 4 is a system block diagram illustrating the dispenser system of the multifunctional dispensing system of FIG. 1.

FIG. 4 is a system block diagram illustrating exemplary components of the dispenser system 100. As shown, the dispenser system 100 includes a dispenser 105, which is in operable communication with a user automobile 130, a user mobile device 135, and/or a station network 140. The station network 140 is in operable communication with a remote user profile server 145 and an advertising and media content provision server 150. The remote user profile server 145 is in operable communication with a user feature database 155 and a user profile database 160.

Figure 5:
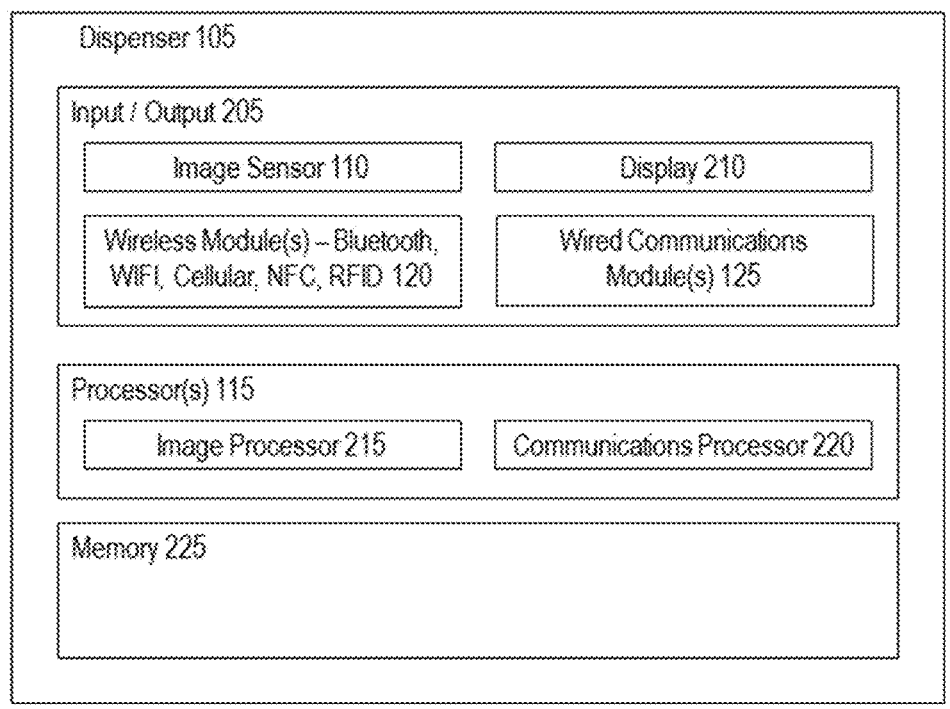
FIG. 5 is a system block diagram of the dispenser in the multifunctional dispensing system of FIG. 1.

FIG. 5 is a system block diagram illustrating electronic components of the dispenser 105. As shown, the dispenser 105 includes an input/output module 205 that includes the image sensor 110, the display 210, wireless module(s) 120, and wired communications module(s) 125. The image sensor 110 can include a digital still or video camera, although other optical sensors capable are possible. The wireless module(s) 120 can operatively connect the dispenser 105 with the user automobile 130 and/or the mobile device 135. The wireless module(s) 120 can include, e.g., a transceiver communicating via Bluetooth protocol, cellular protocol, WIFI protocol, near field communication (NFC), and/or a radio frequency identification (RFID) protocol. The wired communications module 125 operatively connects the dispenser 105 with the remote user profile server 145 and/or an advertising and the media content provision server 150 via the station network 140. The station network 140 can connect multiple dispenser systems 100 together over a local area network (LAN).

As shown in FIG. 5, the dispenser 105 also includes processor(s) 115, which can include one or more processors forming part of at least one computing system. The processor(s) 115 can include an image processor 215 and/or a communications processor 220. The image processor 215 can receive one or more images from the image sensor 110 and determine identity information of a customer and/or the vehicle parked in the fueling/inflation location 50, using the images, for further use in facilitating the fueling and/or inflation transaction. The image processor 215 can also determine the vehicle's relative position in the fueling/inflation location 50. Identity information can include, for example, a facial feature of a customer, a vehicle feature, a license plate number, a non-facial body feature, and the like. The dispenser 105 can also include a memory 225 for storing data utilized by the processor(s) 115 during the fueling and/or tire inflation transaction.

Figure 6:
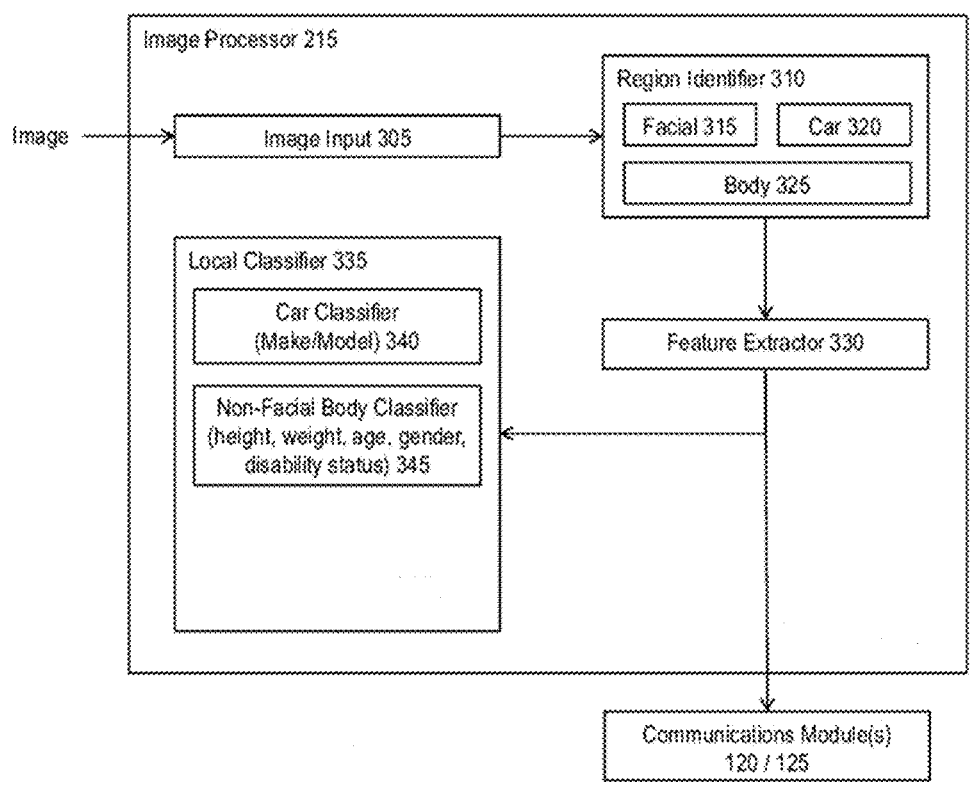
FIG. 6 is a system block diagram of one embodiment of an image processor for use with the multifunctional dispensing system of FIG. 1.

FIG. 6 is a system block diagram illustrating various components of the image processor 215. The image processor 215 can receive an image from the image sensor 110, for example, when the dispenser 105 detects that a customer is in the field of view of the image sensor 110. The image can be of the customer (e.g., can contain a visual representation of the customer) and/or the customer's vehicle, for example. The image processor 215 can receive the image by an image input module 305. A region identifier module 310 can include a facial region identifier 315, a vehicle region identifier 320, and/or a body region identifier 325, which analyze the image to determine regions of the image in which the customer's face, body, and/or vehicle reside. Using one or more of these regions, a feature extractor 330 can determine one or more image features related to the customer's face, body, and/or vehicle. For example, a facial feature can include skin texture; relative position, size, and/or shape of the eyes, nose, cheekbones, and jaw; and the like. Body features can include height, weight, hair color, body shape, and the like. Vehicle features can include shape, color, license plate number, manufacturer/make/model decal, whether the vehicle is clean or dirty, and the like. In at least some implementations, the image processor 215 includes a local classifier 335 having a vehicle classifier 340 and/or a non-facial body classifier 345. The vehicle classifier 340 can classify (or determine) characteristics of the customer's vehicle based on the vehicle features. These characteristics can include, for example, license plate number, vehicle make, required grade and/or type of fuel for the vehicle, and vehicle model.

In at least some implementations, the facial features are conveyed via the dispenser's communications module(s) (wireless module(s) 120 and/or wired communications module(s) 125) to the remote user profile server 145 in order to match the customer with a known customer identity. The remote user profile server 145 can receive the facial features and access the user feature database 155 (which may include one or more databases) containing known customer features. The user feature database 155 can contain features of customers that have previously visited the fuel dispenser 105 or that have previously enrolled in a customer rewards program associated with the facility providing the fuel dispenser 105 and provided an image of their face in association with the program. The user feature database 155 can also associate unique identities (e.g., names or unique identifiers) with known facial features, e.g., in a table. The remote user profile server 145 can compare the received facial features with the features in the user feature database 155 to find a match. If and once a match is found, the remote user profile server 145 can use the associated customer identifier to query the user profile database 160. The user profile database 160 can contain user profiles for each known customer in the feature database 155 (which may include one or more databases). User profiles can include fueling preferences (e.g., preferred fuel grade, fuel type, payment method, loyalty rewards identifier, whether to apply loyalty rewards to a present purchase, whether to purchase a car wash, and the like). The user profile and/or identity can be transmitted from the remote user profile server 145 to the fuel dispenser 105.

The user profile may be received by the communications processor 220 and can be stored in the memory 225. The user profile can be used by the communications processor 220 to provide a customized fueling experience. For example, the user profile can be accessed and the fuel dispenser 105 can be configured with the customer's preferences. This can include rendering, on the display 210, a preference selection screen populated with the customer's fueling preferences as specified in the user profile. In at least some implementations, identity information can be received by the communications processor 220. The identity information can include a name or unique identifier of the customer. This identity information can be used by the communications processor 220 to acquire the user profile from the remote user profile server 145. In at least some implementations the identity information can include, for example, facial features of the customer, vehicle features, license plate number, non-facial body features, and the like.

In at least some implementations, the user identity and/or the vehicle identity can be provided to an advertising and media content provision server 150, which can provide customized or targeted advertisements and content to the fuel dispenser 105 for provision to the customer during fueling and tire inflation, e.g., by displaying the advertisements and content on the display 210. For example, once the user identity is determined, advertisements can be dynamically determined and provided. Such targeted advertisements can pertain to durable goods (e.g., vehicle parts, toys, etc.), perishable goods (e.g., food, drink, etc.), intangible goods (software, digital media, etc.) or services (e.g., oil changes, car washes, insurance/registration renewals, etc.) that are based on the user identity and/or the vehicle identity. For example, an advertisement for insurance or vehicle registration renewals can be generated if, based on the recognition of the vehicle's license plate number, the vehicle's insurance and/or registration is set to expire in the near future. As an additional example, an advertisement for a car wash can be generated if the vehicle identified in the image is dirty. In yet an additional example, an advertisement for high octane fuel can be generated if the vehicle identified in the image is relatively expensive, or if the user is an individual that is likely to purchase high octane fuel based on their purchase history.

Figure 7:
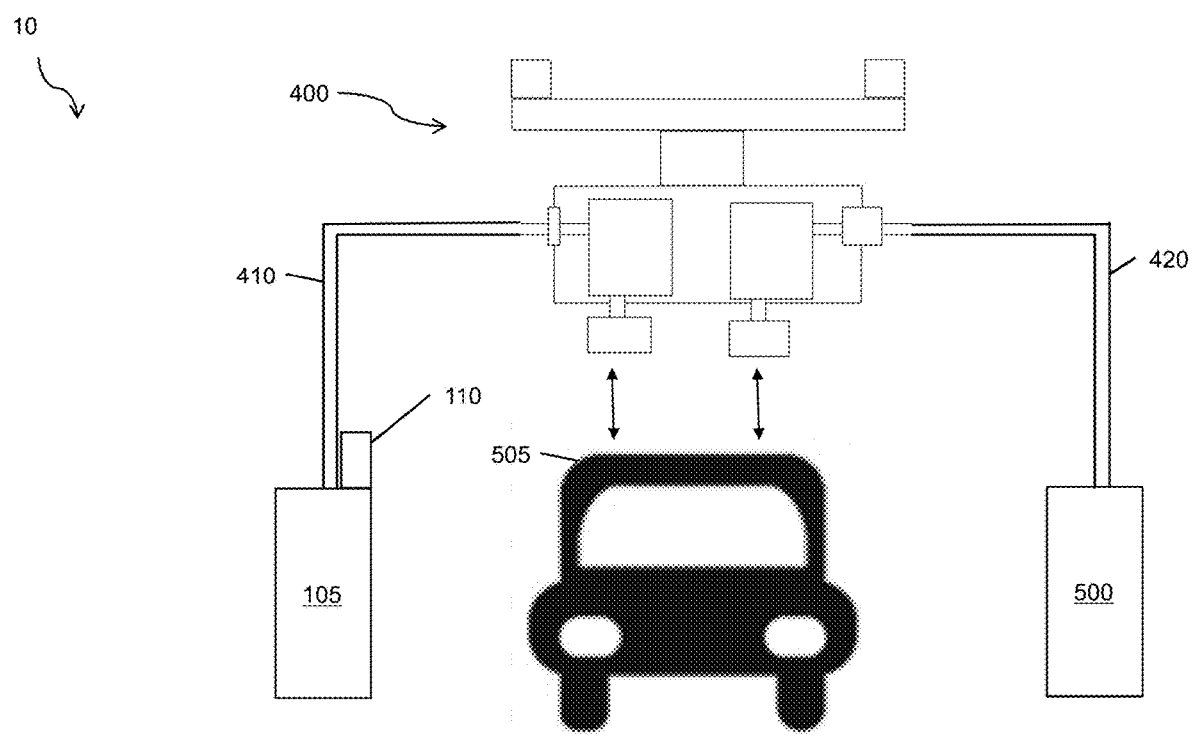
FIG. 7 is a layout view of the multifunctional dispensing system of FIG. 1.

As previously mentioned, the overhead delivery unit 400 is configured to dispense fuel and/or air in response to commands issued from the dispenser 105 of the dispenser system 100. However, the dispenser system 100 also provides additional commands to the overhead delivery unit 400 for moving the unit across the tracks 430a, 430b and the cross member 428 in such a way as to position the fuel dispenser nozzle 414 over the fuel filler door of a vehicle, such as a vehicle 505 (shown in FIG. 7), or the air dispenser nozzle 424 over the tire of the vehicle 505 to be inflated. The positioning commands can be determined by the dispenser system 100 based on the images detected by the image sensor 110. For example, using the processes described above, the dispenser system 100 can identify a vehicle in the fueling/inflation environment from the image obtained by the image sensor 110 and determine the vehicle's location in the fueling/inflation location. The dispenser 105 can retrieve, by connecting to a vehicle dimensions database, the position of the vehicle's fuel filler door and tires relative to the vehicle's exterior dimensions, and then use the retrieved information and the determined vehicle location to determine a location of the vehicle's fuel filler door and tires. The dispenser 105 can direct the housing 402 to be positioned such that the fuel dispenser nozzle 414 is over the vehicle's fuel filler door. The system can also similarly direct the housing 402 to be positioned such that the air delivery nozzle 424 is over the tire to be inflated.

In use, a customer can drive their vehicle to the fueling station, and position their vehicle in a fueling/inflation location proximate the dispenser 105 and underneath the overhead delivery unit 400. The dispenser 105, having recorded an image of the customer and their vehicle via image sensor 110 upon their arrival to the fueling/inflation location, identifies the customer and the vehicle using the processes, components, and functionality described above and determines the vehicle's relative position in the fueling/inflation location. The customer then interacts with the dispenser 105 to select a desired type/grade of fuel and whether the customer wishes to inflate one or more of their tires as part of the transaction. Once the customer has selected their desired transaction elements, the dispenser 105, using the determined position and identity of the vehicle, determines the coordinates of the vehicle's fuel filler door in the fueling/inflation location and generates a command containing instructions for the housing 402 to move the fuel dispenser nozzle 414 to a location overhead of the vehicle's fuel filler door. The housing 402 then translates across the cross member 428 and the tracks 430a, 430b to that location, and the hose reel 416 lowers the fuel dispenser nozzle 414 to the customer for insertion into the fuel tank and fueling. Once the customer has finished fueling their vehicle, the customer removes the fuel dispenser nozzle 414 from their fuel tank and interacts with the dispenser 105 to indicate that the customer has finished fueling their vehicle. The dispenser 105 then sends a command to the hose reel 416 to raise the fuel dispenser nozzle 414.

Having used the image of the vehicle's position in the fueling/inflation location 50 and the vehicle identity to determine the coordinates of the tire(s) the customer has selected for inflation, the dispenser 105 sends an additional command to the overhead delivery unit 400 containing instructions for the housing 402 to move the air dispenser nozzle 424 to a location above the selected tire(s). The housing 402 then translates across the cross member 428 and the tracks 430a, 430b to that location, and the hose reel 426 lowers the air dispenser nozzle 424 to the user for coupling to a valve on the tire and inflation. Once the overhead delivery unit 400 detects that the tire has been inflated to a desired pressure, as either 1) automatically determined by the dispenser 105 after identifying the vehicle and retrieving manufacturer-recommended tire pressures for the tire selected by the customer for inflation or 2) manually input by the customer at the dispenser 105, the overhead delivery unit 400 sends an instruction to the dispenser 105 to alert the customer that the tire has been inflated to the desired pressure. Once the overhead delivery unit 400 has detected that the customer has removed the air dispenser nozzle 424, the overhead delivery unit 400 translates to a location overhead of the next tire selected by the user for inflation, if more than one has been selected, and the process described above repeats until all of the tires have been inflated to the desired pressure. Once the last selected tire has been properly inflated, the overhead delivery unit 400 retracts the air dispenser nozzle 424 and sends a confirmation instruction to the dispenser 105 to indicate that tire inflation has been completed. The dispenser 105 then completes the transaction and indicates to the customer that the transaction has been completed.

As shown and described herein, the system 10 utilizes the dispenser system 100 which is located on the ground and operated in conjunction with the overhead delivery unit 400 as described above. However, in some embodiments, the components of the dispenser 105 described herein can be located in the housing of the overhead delivery unit 400 and can be operated instead by a user interface on the user's mobile device 135. Such an arrangement allows for increased ground space at a fueling station, which provides space for additional cars, lower-profile advertisements, and flat-screen touch displays featuring interactive programming such as games for a customer to play while they await completion of their transactions.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A multifunctional dispensing system, comprising:
    an overhead delivery unit configured to be disposed above a fueling/inflation location, the overhead delivery unit including a housing, a fuel dispensing component disposed at least partially in the housing and configured to dispense fuel, and an air dispensing component disposed at least partially in the housing and configured to dispense air, the fuel dispensing component having a fuel dispenser nozzle and the air dispensing component having an air dispenser nozzle; and
    a dispenser system including:
        an image sensor;
        at least one data processor operatively connected to the image sensor and configured to
            receive an image from the image sensor, the image including a visual depiction of a vehicle in the fueling/inflation location,
            determine an identity of the vehicle from the received image,
            determine a position of the vehicle in the fueling/inflation location from the received image,
            receive, based on the determined identity, relative position data characterizing a relative position of a feature of the vehicle relative to an exterior dimension of the vehicle,
            determine an actual position of the feature of the vehicle based on the received relative position data and the determined position of the vehicle,
            determine, based on the determined actual position, a translation instruction configured to command the housing to translate such that at least one of the fuel dispenser nozzle and the air dispenser nozzle is positioned overhead of the vehicle feature, and
            provide the translation instruction to the housing.

2. The multifunctional dispensing system of claim 1, wherein:
    the fuel dispensing component includes a fuel hose disposed on a fuel hose reel, the fuel hose being coupled to the fuel dispenser nozzle, and the fuel hose being configured to supply fuel to the fuel dispenser nozzle; and
    the air dispensing component includes an air hose disposed on an air hose reel, the air hose being coupled to the air dispenser nozzle, and the air hose being configured to supply air to the air dispenser nozzle.

3. The multifunctional dispensing system of claim 2, wherein the fuel hose reel is configured to rotate in response to an instruction provided by the at least one data processor to thereby raise or lower the fuel dispenser nozzle.

4. The multifunctional dispensing system of claim 2, wherein the air hose reel is configured to rotate in response to an instruction from the at least one data processor to thereby raise or lower the air dispenser nozzle.

5. The multifunctional dispensing system of claim 2, wherein the air hose is in fluid communication with an air regulator configured to modulate a pressure level of air received at the air regulator based on a regulation instruction provided by the at least one data processor.

6. The multifunctional dispensing system of claim 5, wherein the air regulator is at least partially disposed in the housing.

7. The multifunctional dispensing system of claim 2, wherein the fuel hose reel and the air hose reel are each at least partially disposed in the housing.

8. The multifunctional dispensing system of claim 1, wherein the overhead delivery unit includes a cross member disposed proximate the housing and coupled thereto by a mounting bracket coupled to an exterior surface of the housing, the cross member having a first end and a second end opposite the first end.

9. The multifunctional dispensing system of claim 8, wherein the housing is configured to translate along the cross member between the first end and the second end in response to the translation instruction.

10. The multifunctional dispensing system of claim 8, wherein the overhead delivery unit further comprises a first track and a second track, each of the first track and the second track coupled to the cross member.

11. The multifunctional dispensing system of claim 10, wherein the cross member is configured to translate along the first track and the second track in response to the translation instruction.

12. An overhead fluid delivery unit, comprising:
a housing;
a fuel dispensing component disposed at least partially in the housing and configured to dispense fuel, the fuel dispensing component having a fuel dispenser nozzle;
an air dispensing component disposed at least partially in the housing and configured to dispense air, the air dispensing component having an air dispenser nozzle;
a cross member configured to slidably couple to the housing; and
a plurality of tracks, each of the plurality of tracks configured to slidably couple to the cross member and to be disposed above a fueling/inflation location,
wherein the cross member and the plurality of tracks are configured to permit the housing to translate across the fueling/inflation location, and wherein the housing is in operable communication with a dispenser system, the dispenser system including
an image sensor;
at least one data processor operatively connected to the image sensor and configured to
receive an image from the image sensor, the image including a visual depiction of a vehicle in the fueling/inflation location,
determine an identity of the vehicle from the received image,
determine a position of the vehicle in the fueling/inflation location from the received image,
receive, based on the determined identity, relative position data characterizing a relative position of a feature of the vehicle relative to an exterior dimension of the vehicle,
determine an actual position of the feature of the vehicle based on the received relative position data and the determined position of the vehicle,
determine, based on the determined actual position, a translation instruction configured to command the housing to translate such that at least one of the fuel dispenser nozzle and the air dispenser nozzle is positioned overhead of the vehicle feature, and
provide the translation instruction to the housing.

13. The overhead fluid delivery unit of claim 12, wherein the fuel dispensing component further comprises a fuel hose disposed on a fuel hose reel, the fuel hose being coupled to the fuel dispenser nozzle, and the fuel hose being configured to supply fuel to the fuel dispenser nozzle, and the air dispensing component further comprises an air hose disposed on an air hose reel, the air hose being coupled to the air dispenser nozzle, and the air hose being configured to supply air to the air dispenser nozzle.

14. The overhead fluid delivery unit of claim 13, wherein the fuel hose reel is configured to rotate in response to an instruction provided by the at least one data processor to thereby raise or lower the fuel dispenser nozzle.

15. The overhead fluid delivery unit of claim 13, wherein the air hose reel is configured to rotate in response to an instruction from the at least one data processor to thereby raise or lower the air dispenser nozzle.

16. The overhead fluid delivery unit of claim 13, wherein the air hose is in fluid communication with an air regulator configured to modulate a pressure level of air received at the regulator based on a regulation instruction provided by the at least one data processor.

17. The overhead fluid delivery unit of claim 16, wherein the air regulator is at least partially disposed in the housing.

18. The overhead fluid delivery unit of claim 13, wherein the fuel hose reel and the air hose reel are each at least partially disposed in the housing.

19. The overhead fluid delivery unit of claim 12, wherein the fuel dispenser nozzle is configured to dispense varying grades of fuel.

* * * * *